(12) United States Patent
Agrawal et al.

(10) Patent No.: US 11,062,086 B2
(45) Date of Patent: Jul. 13, 2021

(54) PERSONALIZED BOOK-TO-MOVIE ADAPTATION RECOMMENDATION

(71) Applicant: INTERNATIONAL BUSINESS MACHINES CORPORATION, Armonk, NY (US)

(72) Inventors: Priyanka Agrawal, Bangalore (IN); Srikanth Govindaraj Tamilselvam, Chennai (IN); Amrita Saha, Bangalore (IN); Pankaj S. Dayama, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/384,320

(22) Filed: Apr. 15, 2019

(65) Prior Publication Data
US 2020/0327190 A1   Oct. 15, 2020

(51) Int. Cl.
| | |
|---|---|
| *G06F 40/274* | (2020.01) |
| *G06F 16/2455* | (2019.01) |
| *G06K 9/00* | (2006.01) |
| *G06N 20/00* | (2019.01) |
| *G06F 40/30* | (2020.01) |
| *G06F 40/205* | (2020.01) |

(52) U.S. Cl.
CPC ...... *G06F 40/274* (2020.01); *G06F 16/24558* (2019.01); *G06F 40/205* (2020.01); *G06F 40/30* (2020.01); *G06K 9/00744* (2013.01); *G06N 20/00* (2019.01)

(58) Field of Classification Search
CPC ...... G06F 40/30; G06F 40/205; G06F 40/274; G06F 16/284; G06K 9/00671
See application file for complete search history.

(56) References Cited

U.S. PATENT DOCUMENTS

| | | | | |
|---|---|---|---|---|
| 9,800,941 | B2 * | 10/2017 | Evans | H04N 21/440236 |
| 2014/0337374 | A1 * | 11/2014 | Glass | G06F 16/435 |
| | | | | 707/769 |

(Continued)

OTHER PUBLICATIONS

Doll, "The Trouble with Making Books We Love into Movies," The Atlantic, Mar. 23, 2012, p. 1-6, https://www.theatlantic.com/entertainment/archive/2012/03/trouble-making-books-we-love-movies/330196/, Accessed on Apr. 15, 2019.

(Continued)

*Primary Examiner* — Michael N Opsasnick
(74) *Attorney, Agent, or Firm* — Robert R. Aragona

(57) ABSTRACT

A method, computer system, and a computer program product for automatically recommending a plurality of text snippets from a book script for a movie adaptation is provided. The present invention may include receiving, by a user, a piece of input data, wherein the input data includes the book script, and a plurality of past book-to-movie adaptations. The present invention may then include identifying a plurality of text snippets associated with the received book script. The present invention may also include recommending the plurality of text snippets associated with the received book script to include in a movie based on the plurality of past book-to-movie adaptations and a plurality of movie reviews corresponding with the plurality of past book-to-movie adaptations.

20 Claims, 9 Drawing Sheets

(56) References Cited

U.S. PATENT DOCUMENTS

| | | | |
|---|---|---|---|
| 2016/0117311 A1* | 4/2016 | Maetz | G06F 40/295 |
| | | | 704/9 |
| 2016/0246891 A1* | 8/2016 | Accardo | G06F 16/958 |
| 2018/0373979 A1* | 12/2018 | Wang | G06K 9/00671 |

OTHER PUBLICATIONS

Mell et al., "The NIST Definition of Cloud Computing," National Institute of Standards and Technology, Sep. 2011, p. 1-3, Special Publication 800-145.

Panwar et al., "mAnI: Movie Amalgamation using Neural Imitation," ML4Creativity'17, Aug. 2017, 8 Pages, arXiv, Nova Scotia, Canada.

Zhu et al., "Aligning Books and Movies: Towards Story-like Visual Explanations by Watching Movies and Reading Books," mbweb, p. 1-6, https://yknzhu.wixsite.com/mbweb, Accessed on Apr. 15, 2019.

Zhu et al., "Aligning Books and Movies: Towards Story-like Visual Explanations by Watching Movies and Reading Books," IEEE International Conference on Computer Vision, 2015, p. 19-27, IEEE Computer Society.

\* cited by examiner

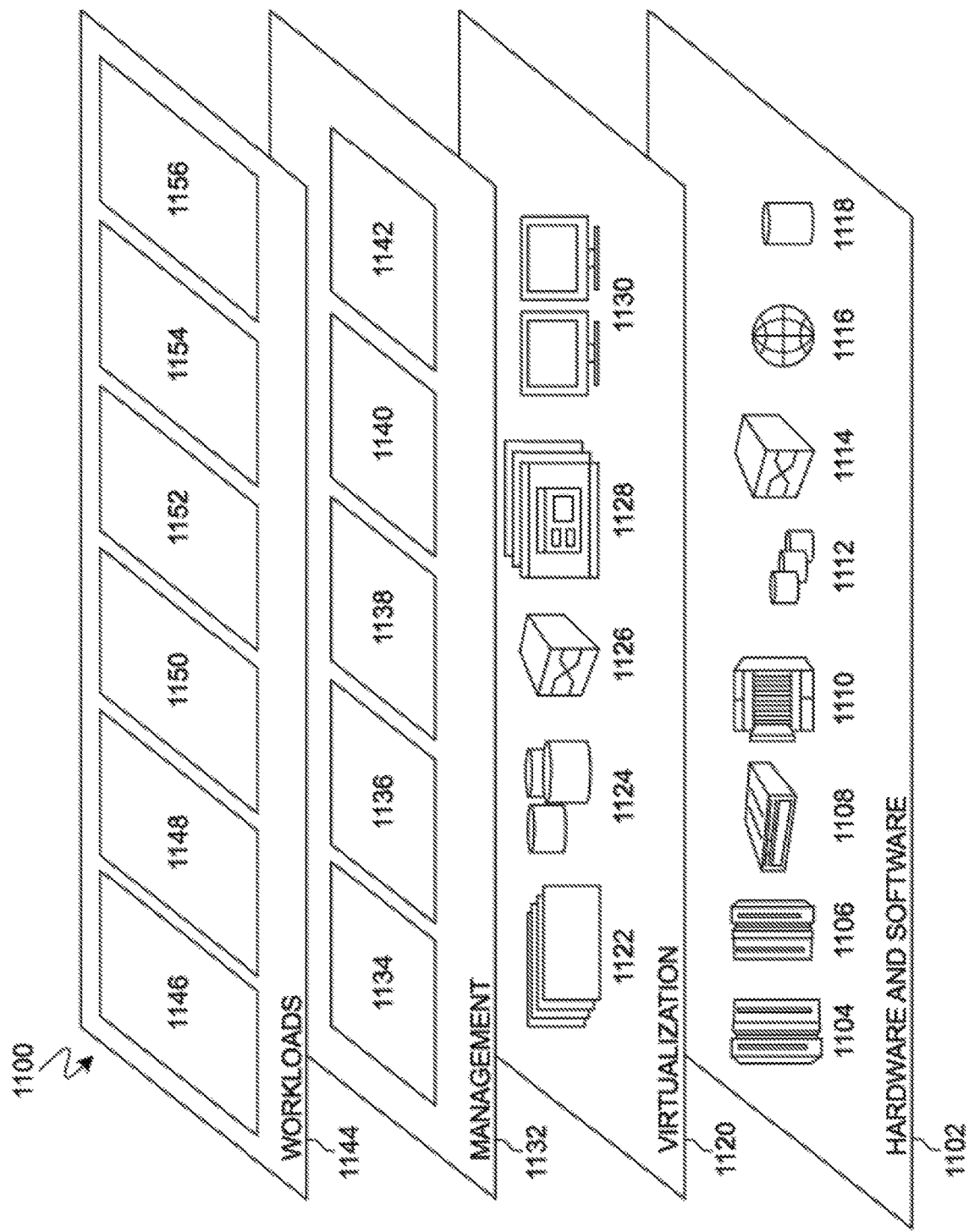

US 11,062,086 B2

PERSONALIZED BOOK-TO-MOVIE ADAPTATION RECOMMENDATION

BACKGROUND

The present invention relates generally to the field of computing, and more particularly to film adaptation.

Often books are adapted to make a movie. A book-to-movie (B2M) adaptation may require general movie making tasks, such as identifying and recommending book portions to include in the movie, cast members to represent the target characters from the book, scene composition corresponding to the plot, and screen time of target characters. Currently, these general movie making tasks may be solely based on human judgment of movie makers. Many of these general movie making tasks, however, may be automatable given the rich historical data and datasets.

SUMMARY

Embodiments of the present invention disclose a method, computer system, and a computer program product for automatically recommending a plurality of text snippets from a book script for a movie adaptation. The present invention may include receiving, by a user, a piece of input data, wherein the input data includes the book script, and a plurality of past book-to-movie adaptations. The present invention may then include identifying a plurality of text snippets associated with the received book script. The present invention may also include recommending the plurality of text snippets associated with the received book script to include in a movie based on the plurality of past book-to-movie adaptations and a plurality of movie reviews corresponding with the plurality of past book-to-movie adaptations.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 9 is a block diagram of functional layers of the illustrative cloud computing environment of FIG. 8, in accordance with an embodiment of the present disclosure.

DETAILED DESCRIPTION

Figure 1:
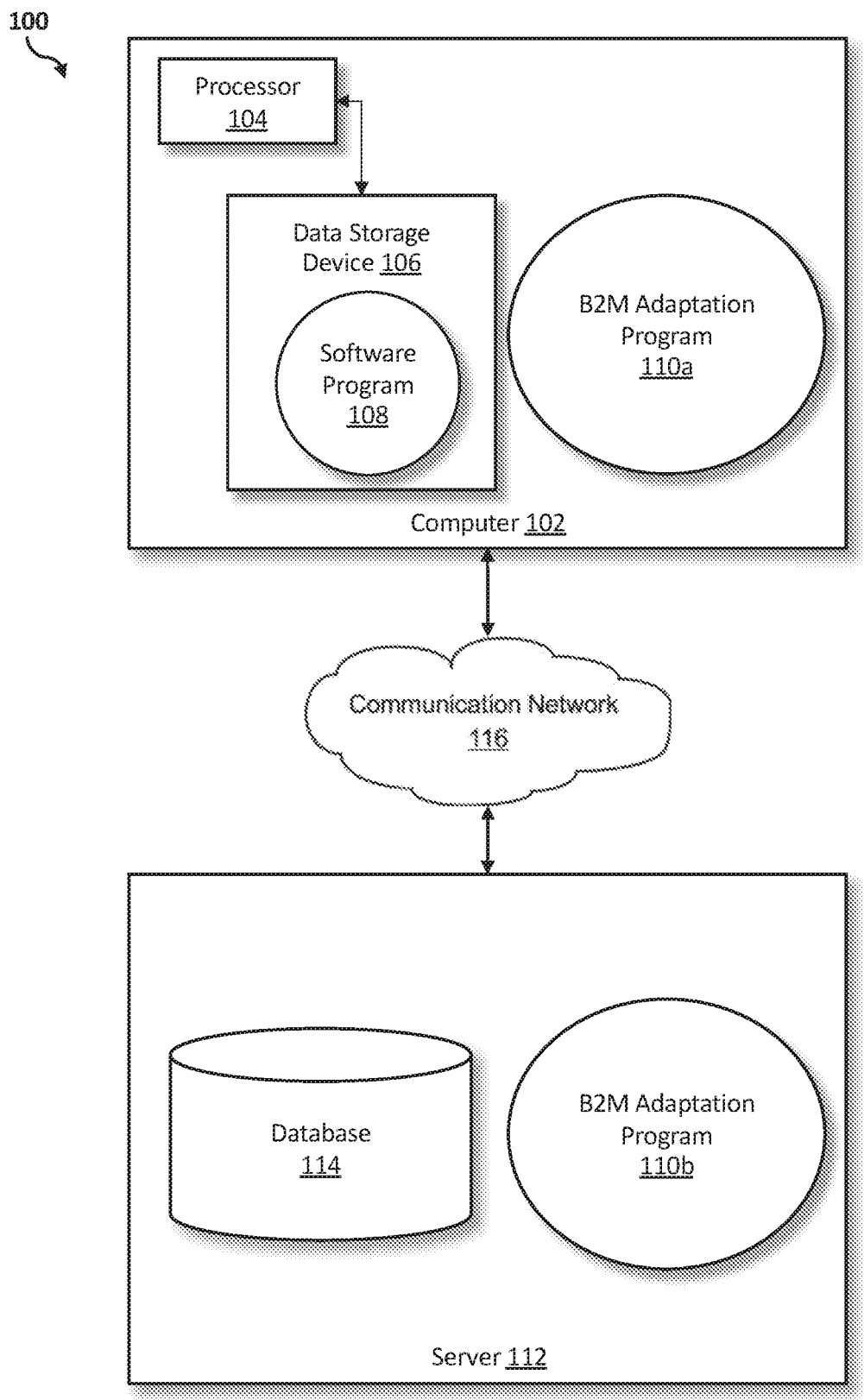
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatically recommending text snippets from a book for a movie adaptation. As such, the present embodiment has the capacity to improve the technical field of film adaptation by automating the process of recommending book portions for a movie adaptation, and determining cast members to represent the target characters in a movie, scene composition corresponding to the plot, screen time of the characters and other general movie making tasks. More specifically, the B2M adaptation program may identify and recommend one or more text snippets that should be included in a movie based on historical movie-review data. The B2M adaptation program may then recommend and rank candidate actors to be target characters in the movie based on the audience demography and trending or popularity of the actors. The B2M adaptation program may also recommend B2M adaptations with varying locations and events based on the audience demography. The B2M adaptation program may then predict the screen time for each target character in each scene based on individual dialogue time.

As previously described, often books are adapted to make a movie. A book-to-movie (B2M) adaptation may include general movie making tasks, such as identifying and recommending book portions to include in the movie, cast members to represent the target characters from the book, scene composition corresponding to the plot, and screen time of target characters. Currently, these general movie making tasks may be solely based on human judgment of movie makers. Many of these general movie making tasks, however, may be automatable given the rich historical data and datasets. Although there are multiple advancements in performing some post analysis to align movies with books, the B2M adaptation program may be utilized to determine the scene composition and screen time of the characters in the movie from the book directly.

Therefore, it may be advantageous to, among other things, recommend casts for characters based on demography, recommend portions of the books that should be included in the movie, and recommend a plot time for each character. As such, the B2M adaptation program may determine the screen time of each character in the movie at an individual dialog level, and may recommend profiles of potential cast members for the movie based on the audience demography from which the availability of the potential cast member may be determined. From past B2M adaptations, the B2M adaptation program may train a dialog level hierarchical recurrent neural network (RNN), which takes a dialog of the movie, and outputs the corresponding screen time for that part of the movie. The B2M adaptation program may employ a post-processing step of normalizing the predicted times to ensure the cumulative time is within a threshold.

According to at least one embodiment, the B2M adaptation program may automate the process of creating movies adapted from one or more books. The B2M adaptation program may identify and recommend book snippets (i.e., text snippets) to include as a part of the movie based on models learned from past book-to-movie adaptations and corresponding reviews for the movie. The B2M adaptation program may also recommend cast members corresponding to book characters (i.e., target characters) based on the demography, trending and other related factors, and then recommend adaptations with varying locations and events based on the audience demography. The B2M adaptation program may then predict the screen time based on target character and scene composition.

According to at least one embodiment, the B2M adaptation program may recommend book portions to be included as part of the movie. The B2M recommendation process includes two methods: (1) mapping portions of the books to the movie (i.e., mapping book portions to movie); and (2) learning the sentiment towards movie snippets. The B2M adaptation program may commence mapping portions of the books to the movie by utilizing training data from a created dataset (e.g., MovieBook dataset) that includes mapping of book portions to movie snippets. The B2M adaptation program may first segment the movie into scenes. Then, for each scene (or video snippet) in the movie, the B2M adaptation program may retrieve the top-k best matches from the events described in the book, using the model trained on the datasets. From the candidate matches, the B2M adaptation program may find the most likely chronologically synchronized matches. Then, the B2M adaptation program may utilize the movie-review data to classify which mappings may be good (e.g., predicted to yield favorable reviews by viewers) or bad (e.g., predicted to yield unfavorable reviews by viewers), and therefore, the importance of book portions in the context of the movie.

According to at least one embodiment, the B2M adaptation program may include learning sentiment towards movie snippets by utilizing training data from detailed reviews of movies adapted from books, indicating which portions were missed in the movie or which portions were aptly portrayed in the movie. The B2M adaptation program may, from the event-wise textual critic available from the review data, map sentiment to the events described in the book based on whether they were missed, shortened, or lengthened in the video, or aptly adapted from the book. The present embodiment may include the B2M adaptation program learning the importance of the events described in the book using the sentiment-to-event mapping data.

According to at least one embodiment, the B2M adaptation program may map reviews of movies adapted from books—to movie segments. The B2M adaptation program may encode the text description of the event discussed in the review, and then map the review to the most similar event described in the book utilizing the nearest neighbor index. The B2M adaptation program may then extract the sentiment from the review towards the text snippet in the book (e.g., event missed in the movie, event poorly depicted in the movie, event well portrayed in the movie). The B2M adaptation program may then train a model which uses the mapping of book portions to sentiment on whether the book portions were accurately represented or adapted in the movie, or whether the movie creators failed to adequately learn the importance of events in the books in adapting to the movie (e.g., whether certain book portions should be included or retained).

According to at least one embodiment, the B2M adaptation program may recommend and rank candidates (i.e., candidate actors and/or actresses) as specific cast members (i.e., target characters) in the B2M adaptation based on the demography of the target audience. The B2M adaptation program may first receive as input data associated with the past performances or auditions of the candidate actors, past movies for the target demography with annotations on the genre, characters, and other factors associated with the success or failure of the past movies. The B2M adaptation program may also provide an actor rating system and the rating for past movies which the candidate appeared in by utilizing a third-party movie rating and data compilation engine (e.g., internet movie database (IMDb®) (IMDb and all IMDb-based trademarks and logos are trademarks or registered trademarks of IMDb.com, Inc. and/or its affiliates), Rotten Tomatoes® (Rotten Tomatoes and all Rotten Tomatoes-based trademarks and logos are trademarks or registered trademarks of Fandango Media, LLC and/or its affiliates), or a public movie rating system).

According to at least one embodiment, the B2M adaptation program may rank the candidate based on the target demography audience. Then B2M adaptation program may utilize an attention network to direct attention to key portions and aspects of the video associated with the candidate. The B2M adaptation program may then utilize a social profile associated with each candidate that includes data associated with the candidate (e.g., salary, ranking, awards) to weight the candidates influence in movies in a particular demography. Based on the aggregated score and the weight, the candidates may be ranked for each recommended target character.

According to at least one embodiment, the B2M adaptation program may predict the screen time. The output may include a real value representing the time in seconds for the dialogue. The B2M adaptation program may utilize mean squared loss for training.

According to at least one embodiment, the recurrent neural network (RNN) framework, utilized by the B2M adaptation program, may be continuous over the book script (i.e., hidden state output of previous scene and the end dialogue may be used to initialize the hidden state for the next scene and the first dialogue). Additional normalization layers across individual dialogues may be based on the total screen time for the scene.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a B2M adaptation program 110a. The networked computer environment 100 may also include a server 112 that is enabled to run a B2M adaptation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the B2M adaptation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the B2M adaptation program 110a, 110b (respectively) to recommend a personalized B2M adaptation. The B2M adaptation method is explained in more detail below with respect to FIGS. 2-6.

Figure 2:
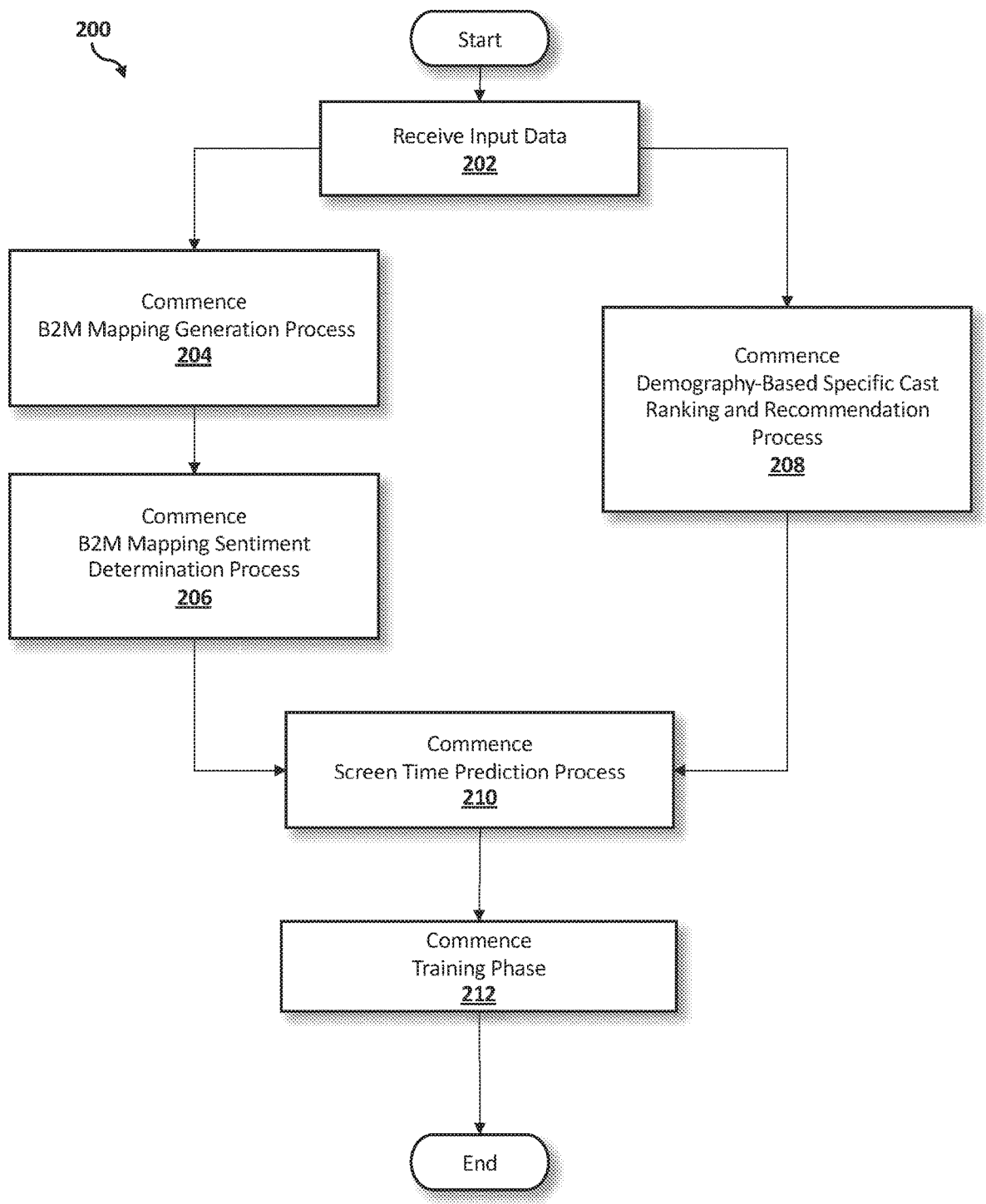
FIG. 2 is an operational flowchart illustrating a process for recommending personalized B2M adaptations according to at least one embodiment.

Referring now to FIG. 2, an operational flowchart illustrating the exemplary personalized B2M adaptation recommendation process 200 used by the B2M adaptation program 110a, 110b according to at least one embodiment is depicted.

At 202, input data is received. Utilizing a software program 108 on the user device (e.g., user's computer 102), a book script (i.e., book), potential cast profiles (i.e., social profiles) associated with a candidate actor/actress (i.e., candidate), movie clips and/or auditions associated with the candidate, and past movie adaptations (e.g., book-to-movie (B2M) parallel corpus, movie reviews and ratings, historical movie review data, any past movies and corresponding metadata associated with different demography) may be received as input, via the communication network 116, by the B2M adaptation program 110a, 110b.

Next, at 204, the B2M adaptation program 110a, 110b performs the B2M mapping generation process. As the book script is received as input, the B2M adaptation program 110a, 110b may perform the B2M mapping generation process in which portions of the book script (e.g., text snippets or book snippets) may be mapped to determine whether the text snippets should be included in the movie. The B2M adaptation program 110a, 110b may produce, as an output, the candidate mappings for each text snippet. A detailed operational flowchart of the B2M mapping generation process in the B2M adaptation program 110a, 110b will be described in greater detail below with respect to FIG. 3. In the present embodiment, the B2M adaptation program 110a, 110b may repeat the B2M mapping generation process until each movie snippet associated with each text snippet has been completely analyzed.

Then, at 206, the B2M adaptation program 110a, 110b performs the B2M mapping sentiment determination process. During the B2M mapping sentiment determination process, the text snippets may be compared to past B2M adaptations and corresponding movie reviews to determine whether the text snippet associated with the candidate mappings should be recommended for the movie. The B2M adaptation program 110a, 110b may produce, as an output, the key portions of the book for the movie. A detailed operational flowchart of the B2M mapping sentiment determination process in the B2M adaptation program 110a, 110b will be described in greater detail below with respect to FIG. 4. In the present embodiment, the B2M adaptation program 110a, 110b may repeat the B2M mapping sentiment determination process until each movie review associated with each text snippet and corresponding candidate mapping has been completely analyzed.

Then, at 208, the B2M adaptation program 110a, 110b simultaneously performs the demography-based specific cast ranking and recommendation process. For example, the B2M adaptation program 110a, 110b may perform the B2M mapping generation process at 204 and the B2M mapping sentiment determination process at 206, while, at the same time, the B2M adaptation program 110a, 110b may perform the demography-based specific cast ranking and recommendation process at 208. During the demography-based specific cast ranking and recommendation process, the B2M adaptation program 110a, 110b may utilize an attention network to attend to the key portions and aspects of each video clip associated with a candidate's past auditions and/or movies, and a social profile associated with the candidate actor to weigh the influence that particular candidate may have with a particular demography. The B2M adaptation program 110a, 110b may then compute an aggregated score for each candidate. Based on the aggregated score and the weight, the B2M adaptation program 110a, 110b may produce, as an output, a ranking and recommendation of each candidate for each target character in the movie. A detailed operational flowchart of the demography-based specific cast ranking and recommendation process in the B2M adaptation program 110a, 110b will be described in greater detail below with respect to FIG. 5.

In another embodiment, the B2M adaptation program 110a, 110b may perform the B2M mapping generation process at 204, the B2M mapping sentiment determination process at 206 and the demography-based specific cast ranking and recommendation process at 208 consecutively. For example, the B2M adaptation program 110a, 110b may perform the B2M mapping generation process at 204 and the B2M mapping sentiment determination process at 206 before the demography-based specific cast ranking and recommendation process at 208, or the B2M adaptation program 110a, 110b may perform the demography-based specific cast ranking and recommendation process at 208 before the B2M mapping generation process at 204 and the B2M mapping sentiment determination process at 206.

Then, at 210, the B2M adaptation program 110a, 110b performs the screen time prediction process. By utilizing the social profiles associated with a candidate and the text snippets from the received book script, the B2M adaptation program 110a, 110b may, as an output, predict the screen time per character and scene. A detailed operational flowchart of the screen time prediction process in the B2M adaptation program 110a, 110b will be described in greater detail below with respect to FIG. 6. In the present embodiment, from past B2M adaptations, the B2M adaptation program 110a, 110b may train a dialog level hierarchical recurrent neural network (hierarchical RNN), which takes a dialog of the movie and outputs corresponding screen time for that part of the movie.

Then, at 212, the B2M adaptation program 110a, 110b commences the training phase. During the training phase, the B2M adaptation program 110a, 110b may utilize a machine learning (ML) model to learn how different books were adapted into movies, from the past training data, and how those movie snippets were received by an audience. As such, the B2M adaptation program 110a, 110b may recommend which portions of the book may be emphasized or de-emphasized in the movie (e.g., through longer or lesser screen time respectively), and which kind of candidates may be better suited for the target characters in the movie. As such, during the training phase, the B2M adaptation program 110a, 110b may first utilize the ML model to learn to map the text snippets to the movie using labeled parallel data between historical books and corresponding movie adaptations and movie reviews. The B2M adaptation program 110a, 110b may then utilize the ML model to learn the public sentiment towards the historical movie snippets from movie review data and social media posts.

Figure 3:
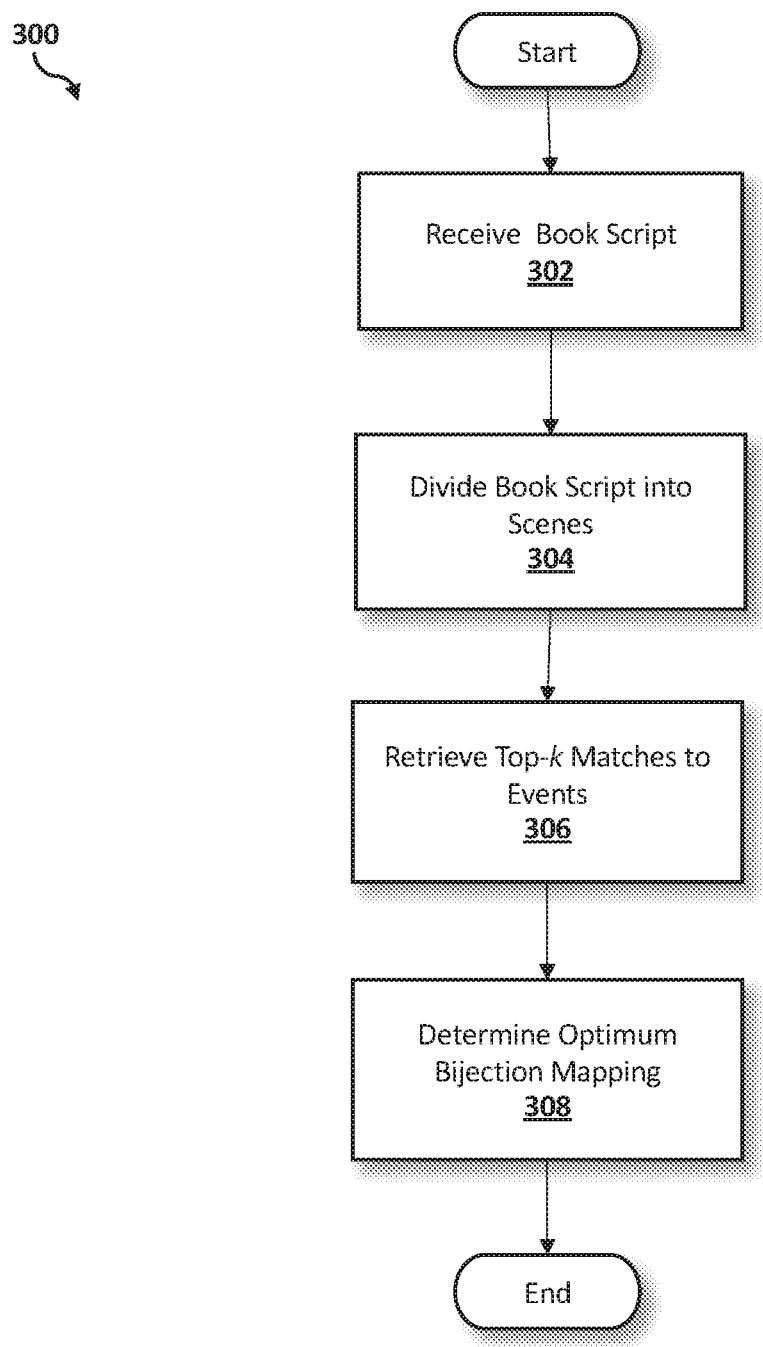
FIG. 3 is an operational flowchart illustrating a process for generating B2M mappings according to at least one embodiment.

Referring now to FIG. 3, an operational flowchart illustrating the exemplary B2M mapping generation process 300 used by the B2M adaptation program 110a, 110b according to at least one embodiment is depicted.

At 302, a book script is received. Utilizing a software program 108 on the user's device (e.g., user's computer 102), the B2M adaptation program 110a, 110b may receive as input, via the communications network 116, the book script (i.e., book). The book script may be uploaded, via the communications network 116, into the B2M adaptation program 110a, 110b for a book database (e.g., database 114), or other repository (i.e., without restrictions on uploading book scripts, or where a user possesses full privileges and rights to access and upload book scripts). Alternatively, the user may manually upload the book script.

In at least one embodiment, the B2M adaptation program 110a, 110b may prompt (e.g., via dialog box) the user to determine whether the user possesses rights and privileges to access and upload the book script onto the B2M adaptation program 110a, 110b. In some embodiments, the B2M adaptation program 110a, 110b may further determine how the user possesses such rights and privileges (e.g., author of the book script or the author of the uploaded portions of the book script, rights and privileges granted by another, the book script was in the public domain, author's rights and privileges have expired or lapsed).

In at least one embodiment, the book script received by the B2M adaptation program 110a, 110b may include one or more books associated with the same story or plot (e.g., trilogy). In some embodiments, the book script may include associated articles, books or other literary materials that include author interviews and discuss literary elements associated with the book(s) (e.g., theme, plot, characters, symbolism, conflicts, point of view, setting).

For example, User T, as a screenplay writer, along with a team of nine other screenplay writers, is creating a movie based on Book XYZ. As such, User T uploads the entire book script for Book XYZ in the B2M adaptation program 110a, 110b.

Next, at 304, the book script is divided into scenes. The received book script may be then fed into a segmentation module which may first parse through the book script, and may then either segment the book script into scenes for a movie adapted from the book based on chapters, sub-titles, sub-headings, or other defined breaks in the book script. Additionally, from historical data of the book script to movie adaptations, the parallel data of the book and movie script (segmented into scenes) may be obtained. Then, from the parallel data, the machine learning (ML) model, utilized in the training phase, may learn events in other books that may be divided or segmented into scenes.

Continuing the previous example, the B2M adaptation program 110a, 110b utilizes the segmentation module to divide Book XYZ into scenes based on the 27 chapters (including prologue and epilogue) of Book XYZ. Then, the segmentation module transmits to the B2M adaptation program 110a, 110b the book script divided into 27 scenes.

Then, at 306, the top-k matches to events are retrieved. For each scene or video snippet in the movie, the B2M adaptation program 110a, 110b may retrieve the top-k textual descriptions of the event that best match the events in the video by utilizing a machine learning (ML) model trained on datasets associated with video recognition and online video technology with mappings of text snippets to movie snippets (i.e., video snippets). The B2M adaptation program 110a, 110b may first break down the video or video snippets as a sequence of images by utilizing a standard video processing toolkit. By utilizing a convolutional neural network (CNN), the B2M adaptation program 110a, 110b may then learn the correlational autoencoder based on multimodal common representation between the image sequence from the video snippets, and the text utilizing the Book-to-Movie (B2M) mapped data. The B2M adaptation program 110a, 110b may then create an approximate nearest neighbor index of the common representation of the text learned, and may encode a given video snippet into the multimodal common representation form.

The B2M adaptation program 110a, 110b may then determine the nearest neighbors to the target encoded video snippet in the common representation space by performing a top-k querying, the B2M adaptation program 110a, 110b may utilize an application program interface (API) that utilizes an algorithm (e.g., Fagin's algorithm (FA), Naïve algorithm, Threshold algorithm (TA)) to sort and rank the neighbors, and return the nearest neighbors in the common representation space (i.e., top-k). The top-k results may then be transmitted from the API, via the communication network 116, to the B2M adaptation program 110a, 110b in which the top-k textual descriptions associated with the book that best match the events in the videos may be retrieved by the B2M adaptation program 110a, 110b.

The B2M adaptation program 110a, 110b may then map the retrieved nearest neighbors to the text snippets in the book to generate the candidate matches for a given video snippet. The video snippet may be taken and encoded in the same representational space as the text snippets in the book by utilizing the annoy index. To identify the video snippet that matches the encoded text snippet, the event mentioned in the video snippet may then be queried to search for the nearest matching book encoding (e.g., nearest neighbor from the text snippets in the book).

Continuing the previous example, the B2M adaptation program 110a, 110b then breaks down the events in each scene, namely Scene 1 of 27, of Book XYZ into multiple text snippets, namely Text Snippets X, Y and Z. From historical data associated with past B2M adaptations, the B2M adaptation program 110a, 110b extracts movies with similar scenes as included in each of the Text Snippets X, Y and Z. The movies are further broken down into video sequences or video snippets, Video Snippets X, Y and Z.

Then, at 308, the optimum bijection mapping is determined. From the possible candidate mappings, the B2M adaptation program 110a, 110b may determine the optimum bijection mappings that satisfy temporal consistency or are best chronologically consistent. The B2M adaptation program 110a, 110b may train a mapping function that scores the text snippets based on temporal consistency with the given scene in the movie. The B2M adaptation program 110a, 110b may pre-train a machine learning (ML) model to create a mapping between the text snippets to the movie scenes based on historical data (e.g., pairing the text snippets to known movie scenes). By utilizing a machine learning (ML) model that learns the mapping between the text snippets to the movie scenes based on historical data, the B2M adaptation program 110a, 110b may pair an element of the first set (i.e., first element) (e.g., a text snippet associated with the generated candidate matches) to an element of a second set (i.e., second element) (i.e., a video snippet) to determine a one-to-one correspondence between the two elements. The B2M adaptation program 110a, 110b may then eliminate any unpaired elements and any overlapping or correlation of elements (i.e., no more than one first element may be mapped to the same second element, or no more than one second element may be mapped to the same first element). By learning the mapping, the B2M adaptation program 110a, 110b may learn to adhere to the temporal consistency of events described in the book script and the movie.

Additionally, the B2M adaptation program 110a, 110b may then perform an iterative process of determining the mapping function between the text snippets and the video snippets, thereby repeating steps 304 to 308 of the B2M mapping generation process 300, for each text snippet associated with the book, regardless of whether the text snippet is present or absent from the possible candidate mappings.

Continuing the previous example, the B2M adaptation program 110a, 110b then matches each of the Text Snippets X, Y and Z with the Video Snippets X, Y and Z, where Text Snippet X is matched with Video Snippet X, Text Snippet Y is matched with Video Snippet Y, and Text Snippet Z is matched with Video Snippet Z, thereby generating Candidate Mappings X, Y and Z, respectively.

Figure 4:
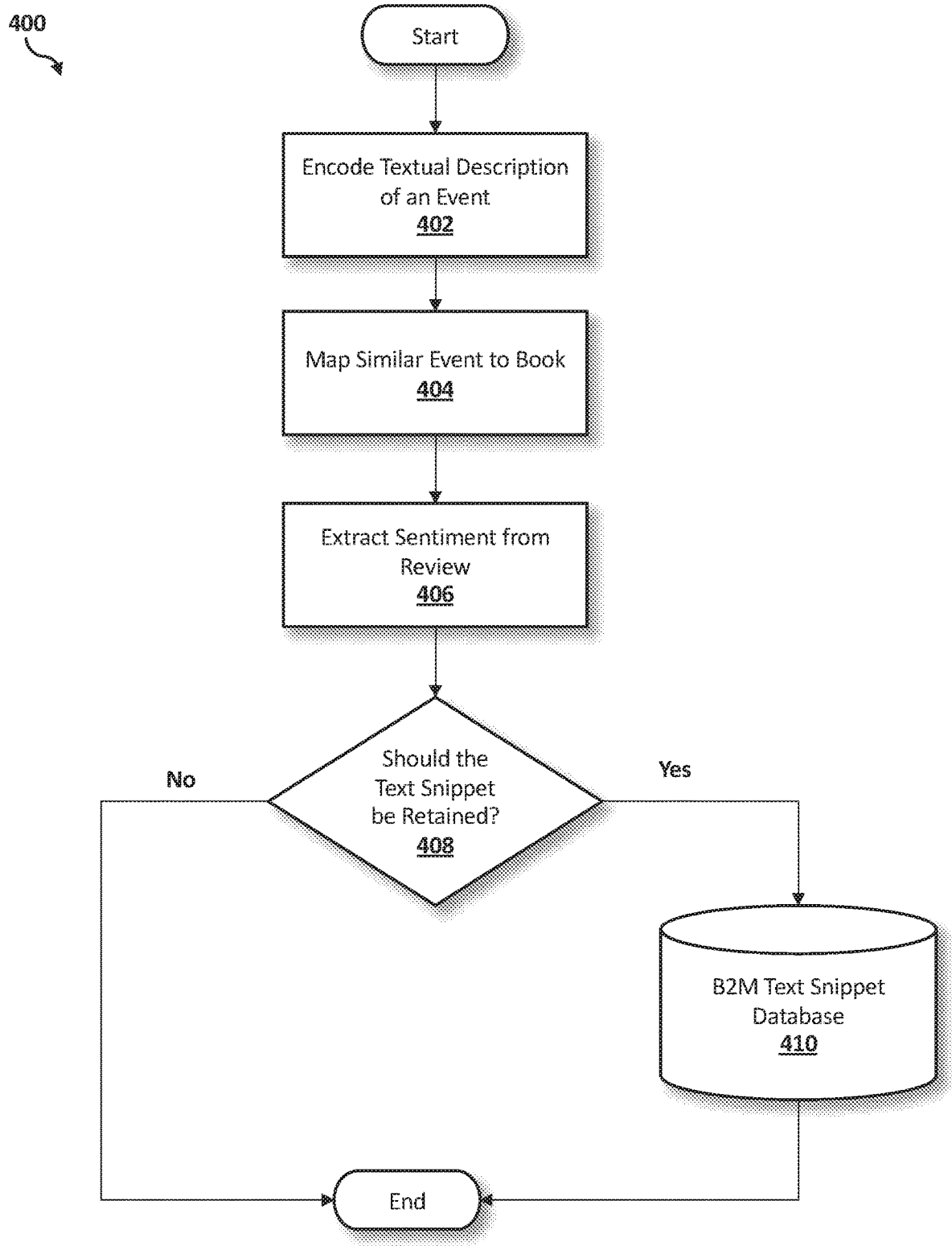
FIG. 4 is an operational flowchart illustrating a process for determining the sentiment towards a B2M mapping according to at least one embodiment.

Referring now to FIG. 4, an operational flowchart illustrating the exemplary B2M mapping sentiment determination process 400 used by the B2M adaptation program 110a, 110b according to at least one embodiment is depicted.

At 402, the textual description of an event is encoded. Utilizing a software program 108 on the user's device (e.g., user's computer), the B2M adaptation program 110a, 110b may receive, as input, the textual description of each event in a movie review, via the communication network 116. The textual description may be received from a movie review database (e.g., database 114) in which movie reviews are uploaded, saved and accessed by the user as necessary. Alternatively, the movie review may be uploaded from a website, document, social media post, or blog, via the communication network 116, selected by the user. In at least one embodiment, the user may manually upload a written movie review into the B2M adaptation program 110a, 110b.

In at least one embodiment, the movie reviews may include details associated with the B2M adaptation. Such details may include which portions of the book (i.e., book portions) were included or excluded from the movie, what portions were shortened or lengthened, and what book portions were changed based on various factors (e.g., director's choice, demographic preferences, past movie reviews). In some embodiments, the reasons for any inclusions/exclusions, or changes (e.g., lengthened, shortened) to any book portion may be included with the movie review. In some embodiments, if the movie review fails to include the reasons for the changes or inclusions/exclusions to any book portion, then the B2M adaptation program 110a, 110b may include a link to associated blogs, websites or social media posts with potential reasons for the such changes or inclusions/exclusions.

Continuing the previous example, the Candidate Mappings X and Z are received by the B2M adaptation program 110a, 110b, and Movie Review $X_1$ and Movie Review $Z_1$, which include additional details associated with Video Snippets X and Z are also uploaded into the B2M adaptation program 110a, 110b.

Then, at 404, the most similar event to the book is mapped. The B2M adaptation program 110a, 110b may retrieve the mapped text snippets associated with the book from the output of FIG. 3. To identify which book portion that the movie review may be associated with, the event mentioned in the movie review may be encoded and queried for the most matching encoded book portions (i.e., nearest neighbors). The encoded textual description of the movie review (i.e., text snippet) may then be indexed into an annoy index. The B2M adaptation program 110a, 110b may utilize the nearest neighbor index to determine the most similar event (nearest neighbor index) from the book text snippet and the movie review. The most similar event (or nearest neighbor index) from the book text snippet may then be mapped to the most similar event in the movie review. The B2M adaptation program 110a, 110b may sort the events in order from the most similar vector (i.e., most similar event) to the least similar vector (i.e., least similar event).

In at least one embodiment, the B2M adaptation program 110a, 110b may utilize other approaches (e.g., non-metric space library (nmslib) when using the hierarchical navigable small world graph (HNSW) index option, Faiss) to retrieve similar events.

Continuing the previous example, the Text Snippets and Candidate Mappings X and Z are further broken down into events (Events $X_1$, $X_2$, $X_3$ for Text Snippet and Candidate Mapping X, and $Z_1$, $Z_2$ and $Z_3$ for Text Snippet and Candidate Mapping Z), and the most similar events in Text Snippets X and Z are further compared with Movie Reviews $X_1$, and $Z_1$ to determine similar events mentioned in each of the movie reviews. The events are sorted based on the most similar event to the least similar event to the Text Snippets X and Z. The following is the order from most similar to least similar:

Text Snippet and Candidate Mapping X: Events $X_1$, $X_2$, $X_3$
Text Snippet and Candidate Mapping Z: Events $Z_3$, $Z_2$, $Z_1$ Then, at 406, the sentiment from the review is extracted. The B2M adaptation program 110a, 110b may utilize a natural language processing parser (i.e., NLP parser) to parse through the movie review, and identify sentiments (e.g., opinions) associated with the most similar event in the movie review to the text snippet. The identified sentiment may then be extracted by an extractor in which NLP techniques (e.g., structure extraction, phrase extraction, relationship extraction, fact extraction, clustering content, categorizing content) may utilized to categorize the identified sentiments associated with the most similar event in the movie review and the text snippet (e.g., event badly depicted in the movie, event well-portrayed in the movie). In at least one embodiment, the NLP parser utilized by the B2M adaptation program 110a, 110b may identify keywords, phrases, paragraphs, and sentence structure by implementing various NLP techniques (e.g., language identification, decompounding, acronym normalization and tagging, lemmatization/stemming).

Continuing the previous example, an NLP parser was utilized to determine the following sentiments associated with the most similar event for Text Snippet and Candidate Mapping X and Z:

Text Snippet and Candidate Mapping X: Event $X_1$ (Provides poor insight in the plot and lack of involvement by all the main target characters)

Text Snippet and Candidate Mapping Z: Event $Z_3$ (Good plot twist and very unexpected)

Then, at 408, the B2M adaptation program 110a, 110b determines if the text snippet should be retained. The B2M adaptation program 110a, 110b may utilize a convolutional neural network (CNN) classifier to combine the mappings of the most similar events in the text snippets with the sentiments in the movie review, based on the movie-review data derived from historical data associated with previously released B2M adaptations and corresponding movie reviews, to recommend whether to retain a particular event associated with the text snippet and candidate mapping based on whether the sentiment includes a positive review of the most similar event of the text snippet and movie review. If the trained classifier determines, based on the historical data, that the possible candidate mapping (i.e., optimum bijection mapping) would receive favorable or positive reviews based on the historical data, then the classifier may recommend that the event associated with text snippet and the possible candidate mapping should be included in the movie (i.e., the classifier may label the text snippet as "good"). If, however, the classifier determines that the possible candidate mapping would not receive a favorable review (e.g., would receive an unfavorable or negative review) based on the historical data, then the classifier may recommend that the event associated with the text snippet and the candidate mapping should be excluded from the movie (i.e., the classifier may label the text snippet as "bad").

Additionally, the determination of whether a text snippet and associated candidate mapping should be retained may be directly correlated to the importance of the text snippet (e.g., the event described in the text snippets) to the book. If the B2M adaptation program 110a, 110b determines that the event described in the book should be retained, then the text snippet in which the event is described may be deemed as important in the book and thereby important in the movie.

The classifier may transmit, via the communications network 116, a list of text snippets and associated candidate mappings classified as should be included in the movie to the B2M adaptation program 110a, 110b. In at least one embodiment, the classifier may transmit, via the communications network 116, an additional list of text snippets and associated candidate mappings classified as should be excluded from the movie.

If the B2M adaptation program 110a, 110b determines that the text snippet should be retained at 408, then the retained text snippet is saved in a B2M text snippet database 410 (e.g., database 114) and the B2M adaptation program 110a, 110b may proceed to 404 to map the next most similar event in the text snippet with the encoded textual description associated with the movie review. The B2M adaptation program 110a, 110b may continue to proceed from 404 until the last most similar event associated with the text snippets and movie reviews has been analyzed to determine whether the text snippet may be retained for the movie.

Continuing the previous example, the B2M adaptation program 110a, 110b recommends that Text Snippet X and Candidate Mapping X associated with Event $X_1$ should not be retained for the movie. However, Event $Z_3$, which is associated with Text Snippet Z and Candidate Mapping Z, should be included in the movie. The B2M adaptation program 110a, 110b then proceeds with the next similar events ($X_2$ and $Z_2$) to determine whether the next similar event should be included in the movie.

If, however, the B2M adaptation program 110a, 110b determines that the text snippet should not be retained at 408, then the text snippet is not saved to the B2M text snippet database 410. The B2M adaptation program 110a, 110b may continue to proceed from 404 until the last most similar event associated with the text snippets and movie reviews has been analyzed to determine whether the text snippet may be retained for the movie. The B2M adaptation program 110a, 110b may then proceed to conclude the sentiment determination for that particular B2M mapping, if the classifier fails to recommend retaining any of the text snippets associated with the candidate mappings.

Continuing the previous example, if the classifier failed to recommend Text Snippets and Candidate Mappings X, Y and Z, then B2M adaptation program 110a, 110b ends.

In the present embodiment, the B2M adaptation program 110a, 110b may proceed by retrieving the next most similar event to the book at 404, until the similar vectors associated with the encoded textual descriptions (i.e., text snippets) are depleted.

Regardless of whether the text snippet is retained or not, the B2M adaptation program 110a, 110b may utilize the data generated by the mappings of the text snippets to the sentiments (i.e., sentiment-to-event mapping data) as training data to train a machine learning (ML) model. The training data may be utilized to improve the accuracy of the ML model when analyzing future text snippets to movie snippets and the corresponding movie reviews. In at least one embodiment, the training data may be utilized by future B2M adaptations within the same genre, or with similar events.

Figure 5:
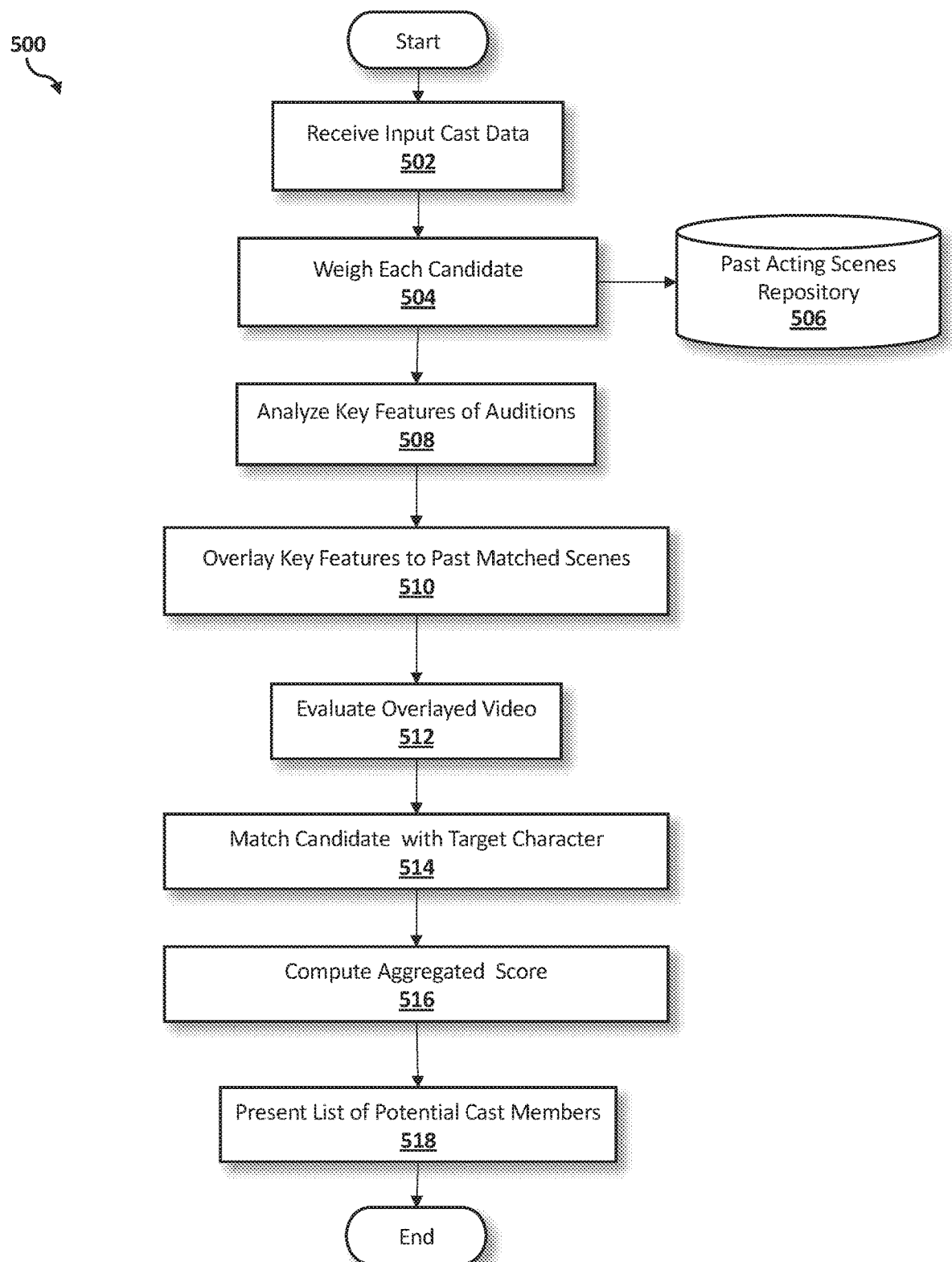
FIG. 5 is an operational flowchart illustrating a process for ranking and recommending specific cast members based on demography according to at least one embodiment.

Referring now to FIG. 5, an operational flowchart illustrating the exemplary demography-based specific cast ranking and recommendation process 500 used by the B2M adaptation program 110a, 110b according to at least one embodiment is depicted.

At 502, input cast data is received. Utilizing a software program 108 on the user's device (e.g., user's computer 102), the B2M adaptation program 110a, 110b receives as input cast data (i.e., input data), via the communication network 116, a social profile associated with a candidate (i.e., actor or/and actress) from an actor and/or movie rating system (e.g., IMDb®, Rotten Tomatoes®), any video clips of the candidate's past performances and/or auditions, and any past movies for the target demography with annotations from a movie rating system (e.g., IMDb®, Rotten Tomatoes®) on several elements of the movie (e.g., characters, plot, genre). The B2M adaptation program 110a, 110b may utilize a search engine to search the internet for the input data, and the search engine may then transmit the input data to the B2M adaptation program 110a, 110b, or to a repository 506 (e.g., database 114) associated with the B2M adaptation program 110a, 110b for future access and use.

Additionally, the ML model may include metadata with demographic data associated with each movie (e.g., the demography that each movie was released in and the relative success rate in different demography, whether the book was adapted differently for different demography). The demographic data may be utilized to train the ML model with specific versions of movie adaptations for the same book.

In at least one embodiment, the social profile associated with the candidate may include salary (e.g., candidate in past movies and any salary requirements), ranking of the candidate, and awards and/or accomplishments earned by the candidate. The data associated with the social profile of the candidate actor may be utilized to weigh the influence of the candidate in movies within a particular demography.

In another embodiment, if the candidate possesses no social profile and/or past video clips, the B2M adaptation program 110a, 110b may search the internet for any social media posts associated with the candidate and/or any information (e.g., video clips, blogs, podcasts, visual and/or audio recordings) associated with the candidate in lieu of a social profile and/or video clip. If no such information may be retrieved on the candidate, then the B2M adaptation program 110a, 110b may analyze the candidate, in the absence of such information, as if such information does not exist. However, when the final rankings and recommendations are presented to the user, the B2M adaptation program 110a, 110b may indicate which information (e.g., social profiles, video clips) were missing and what, if any, information was utilized in lieu of the missing information associated with the candidate.

Continuing the previous example, for the movie adaptation associated with Book XYZ (Movie XYZ), the B2M adaptation program 110a, 110b receives the following input cast data for Candidates A, F and K, who are interested in playing Target Character Q:

Candidate A: a social profile associated with Candidate A (Social Profile A), three video clips associated with Candidate A (Video Clips A, B and C) and five past movies in which Candidate A appeared in (Past Movies A, B, C, D and E).

Candidate F: a social profile associated with Candidate F (Social Profile F), two video clips associated with Candidate F (Video Clips F and G) and two past movies in which Candidate F appeared in (Past Movies F and G).

Candidate K: a social profile associated with Candidate K (Social Profile K), one video clip associated with Candidate K (Video Clip K) and one past movie in which Candidate K appeared in (Past Movie K).

Next, at 504, each candidate is weighed. The B2M adaptation program 110a, 110b may then rank (or weigh) each candidate, based on the input data associated with the candidate (e.g., any video clips of the candidate's past performances and/or auditions, and social profile associated with the candidate), whose input data is dated within a specified period of time (e.g., a default setting is two years).

Additionally, the B2M adaptation program 110a, 110b may review the past acting scenes repository 506 (e.g., database 114), and select and organize (i.e., curate) past good quality acting scenes to save in the past acting scenes repository 506 based on the movie reviews from the data associated with the past movies for target demography. The past good quality acting scenes may include videos and/or images by the top-rated candidates for each target character in which the scene includes relevant images and/or videos depicting the candidate in a similar character role in a movie or audition of the similar genre. The determination of which acting scenes constitute good quality may be based on the identified sentiments of the movie reviews that involve certain characters discussed in the movie reviews.

The B2M adaptation program 110a, 110b may then store the movie clips of the candidates that represent good quality acting scenes into the past acting scenes repository 506 and further utilize the stored good quality acting scenes to determine an aggregated score for each of the candidates for the target character.

In at least one embodiment, the B2M adaptation program 110a, 110b may eliminate the candidates with the lowest weight (or a certain number of the low weighed candidates (e.g., eliminating the three lowest weighed candidates)) from the demography-based specific cast ranking and recommendation process 500.

Continuing the previous example, the B2M adaptation program 110a, 110b then weighs each candidate, as follows, based the input data associated with the candidate:

Candidate A: Highest Weight because Candidate A has the most video clips and past movies, and three out of the five past movies that Candidate A appeared in received favorable movie reviews.

Candidate K: Second Highest Weight. Even though Candidate K had the least amount of video clips and past movies, the one past movie that Candidate K appeared in received favorable reviews and was critically acclaimed. In addition, the performance of Candidate K in that movie received extremely favorable reviews.

Candidate F: Lowest Weight because each of the two past movies that Candidate F appeared in received unfavorable reviews and have very poor audience ratings.

The B2M adaptation program 110a, 110b may then store the movie clips that represent the best or good quality acting scenes for each candidate in the past acting scenes repository 506.

Then, at 508, key features of the auditions are analyzed. The B2M adaptation program 110a, 110b may identify key features of the auditions associated with the candidate that infer visual persuasion. The key features for visual persuasion (e.g., the persuasiveness of the actor's performance) may include body language, gestures, speech and facial expressions associated with the audition performance of the candidate. The B2M adaptation program 110a, 110b may identify the key features for visual persuasion from images and videos by utilizing deep learning techniques (e.g., multi-scale deep learning for gesture detection and localization, detecting influential images by understanding gestures, inferring visual persuasion via body language, setting, and deep features). The B2M adaptation program 110a, 110b may utilize a generative adversarial network (GAN) to compute a persuasiveness score (e.g., normalized quantity ranging from 0-1, 0-10, 0-100) for each candidate based on average of the real valued scoring of the persuasiveness of the past movies and/or auditions of candidate. In at least one embodiment, the B2M adaptation program 110a, 110b may generate a persuasiveness score as a percentage (e.g., normalized quantity ranging from 0-100%).

To compute the persuasiveness score, the B2M adaptation program 110a, 110b may analyze the key features for visual persuasion, and may determine whether the key features were present, whether these key features negatively or positively influenced the performance of the candidate, and to what specific degree did the key feature influence the performance.

Continuing the previous example, the B2M adaptation program 110a, 110b determines that four key features were present in the performance of Candidates A, F and K. Then, the B2M adaptation program 110a, 110b equally divides the scoring range for persuasiveness score. Therefore, each key feature is given a range of 0-0.25 in a 0-1 range, 0-2.5 in a 0-10 range, or 0-25 in a 0-100 range. The B2M adaptation program 110a, 110b then determines the following persuasiveness score for each candidate:

Candidate A: Low influence in body language and speech, and a high influence in gestures and facial expression. As such, body language (0.09), speech (0.07), gestures (0.19), and facial expression (0.20) with a persuasiveness score of 0.55 out of 1.

Candidate F: High influence in body language and speech, and a high influence in gestures and facial expression. As such, body language (0.24), speech (0.23), gestures (0.20), and facial expression (0.20) with a persuasiveness score of 0.87 out of 1.

Candidate K: Low influence in body language and gestures, and a low influence in speech and facial expression. As such, body language (0.07), speech (0.07), gestures (0.07), and facial expression (0.07) with a persuasiveness score of 0.28 out of 1.

Then, at 510, the analyzed key features are overlayed on the past matched scenes. During the overlay process, the analyzed key features for each candidate, transmitted by an external input via the communication network 116 to the B2M adaptation program 110a, 110b, may be transferred and/or paired with the past matched scenes (e.g., original video snippets) to create an overlayed video by utilizing a generator.

During the GAN setup, the generator may be trained to generate overlayed videos in which the key features of the candidate (e.g., voice of the candidate with other aspects of the past matched videos) are overlayed on the original video snippets. In the present embodiment, the generator may continuously perform the overlaying process (e.g., pairing analyzed key features with original video snippets) in a loop until the pool of unpaired analyzed key features and original video snippets are depleted.

Continuing the previous example, the B2M adaptation program 110a, 110b generates overlayed videos for Candidates A, F and K. Therefore, the B2M adaptation program 110a, 110b generated Overlayed Video A for Candidate A, Overlayed Video F for Candidate F and Overlayed Video K for Candidate K. Each overlayed video is created based on three scenes from the Original Video Snippet X.

Then, at 512, the overlayed video is evaluated. During the GAN (i.e., deep learning model) setup, a discriminator may be utilized to discriminate the overlayed video from the naturally occurring videos. As such, the B2M adaptation program 110a, 110b may utilize a discriminator to evaluate the overlayed video. The more difficulty that the discriminator experiences when discriminating the overlayed video from the naturally occurring video, then the greater the accuracy of the generator. The B2M adaptation program 110a, 110b may utilize this adversarial method for the GAN to learn to overlay videos better, until the generator is able to successfully deceive the discriminator with a margin of loss, and the discriminator is unable to discriminate between an overlayed video and a naturally occurring video (e.g., real video).

Additionally, the B2M adaptation program 110a, 110b may utilize the GAN to inherently analyze the original video snippet and overlayed video, and compute a GAN score (e.g., normalized quantity ranging from 0-1, 0-10, 0-100) associated with the quality of the overlayed video compared to the original video snippet, which includes the quality of the acting style of the candidate. To compute the GAN score, the B2M adaptation program 110a, 110b may analyze whether the quality of the overlayed video is similar to, or the same as, the original video snippet. In at least one embodiment, the B2M adaptation program 110a, 110b may generate a GAN score as a percentage (e.g., normalized quantity ranging from 0-100%).

Continuing the previous example, the B2M adaptation program 110a, 110b compares Overlayed Videos A, F and K with Original Video Snippet X, then the B2M adaptation program 110a, 110b determines how similar or different each overlayed video is to Original Video Snippet X is for the scoring range for $GAN_{score}$. Therefore, given a range of 0-0.5 in a 0-1 range, 0-5.0 in a 0-10 range, or 0-50 in a 0-100, a range is applied to each overlayed video that is different from the Original Video Snippet X. The B2M adaptation program 110a, 110b makes the following determination and computes following GAN score for each of the overlayed videos:

Overlayed Video A: lacks similarity to Original Video Snippet X, then the GAN score is computed as 0.30 out of 1.

Overlayed Video F: high similarity to Original Video Snippet X, then the GAN score is computed as 0.90 out of 1.

Overlayed Video K: moderate similarity to Original Video Snippet X, then the GAN score is computed as 0.55 out of 1.

Then, at 514, the candidate is matched with a target character. The B2M adaptation program 110a, 110b may utilize a natural language processing (NLP) parser to search through the book script to compile a textual description of each target character. The textual description may include the personality traits, physical appearance, mood, and distinguishable traits of each target character. The B2M adaptation program 110a, 110b may also extract a textual description of the setting or location of the target characters in the book script. The compiled textual description may be compared with the social profile associated with each candidate, which includes images and/or photographs of the candidate. The B2M adaptation program 110a, 110b may then compute a consistency score (e.g., normalized quantity ranging from 0-1, 0-10, 0-100) associated with the consistency between the candidate and the target characters based on the textual description from the book script. In at least one embodiment, the B2M adaptation program 110a, 110b may generate a consistency score as a percentage (e.g., normalized quantity ranging from 0-100%).

To compute the consistency score, the B2M adaptation program 110a, 110b may analyze the textual description of each target character with the social profiles of each candidate, and may determine which textual description matches which candidate, and to what specific degree the textual description for each target character match each candidate.

Continuing the previous example, the B2M adaptation program 110a, 110b extracts textual descriptions associated with three aspects of Target Character Q, namely personality traits, mood and physical appearance. Then, the B2M adaptation program 110a, 110b equally divides the scoring range for the consistency score. Therefore, each aspect of the textual description is given a range of 0-0.33 in a 0-1 range, 0-3.3 in a 0-10 range, or 0-33 in a 0-100 range. The B2M adaptation program 110a, 110b applies a score to each of the aspects of the textual description based on how similar or different the candidate actor is to the particular aspect of the textual description of each target character. When compared to Target Character Q, the candidates' consistency scores were as follows:

Candidate A: personal appearance (0.3), personality traits (0.3), and mood (0.28) with a consistency score computed as 0.88 out of 1.

Candidate F: personal appearance (0.1), personality traits (0.06), and mood (0.1), then the consistency score is computed as 0.26 out of 1.

Candidate K: personal appearance (0.2), personality traits (0.2), and mood (0.3), then the consistency score is computed as 0.70 out of 1.

In the present embodiment, the B2M adaptation program 110a, 110b may compute a consistency score for each candidate with a corresponding target character. Therefore, the B2M adaptation program 110a, 110b may compute consistency scores for each target character for each candidate, regardless of whether the candidate did or did not express an interest that that particular target character.

In at least one embodiment, the B2M adaptation program 110a, 110b may, however, automatically include only the lowest consistency score for each candidate, and therefore, remove the candidate from playing the target character associated with their lowest consistency score. In at least one embodiment, the B2M adaptation program 110a, 110b may automatically include only the highest consistency scores (e.g., the default is the highest three consistency scores) for each candidate. Therefore, the B2M adaptation program 110a, 110b may automatically eliminate candidates from playing a target character for which the candidate failed to obtain a high consistency score. In some embodiments, the administrator may configure the settings to change the default settings on number of high consistency scores that are included by the B2M adaptation program 110a, 110b.

In at least one embodiment, the B2M adaptation program 110a, 110b may automatically retain consistency scores that satisfy a previously determined threshold level (e.g., 0.5 out of 1.0, 5.0 out of 10, 50 out of 100, 50% out of 100%). If the consistency score is higher than the previously determined threshold level, then the B2M adaptation program 110a, 110b may determine that the consistency score satisfies the threshold level. If, however, the consistency score is equal to or less than the previously determined threshold level, then the B2M adaptation program 110a, 110b may determine that the consistency score fails to satisfy the threshold level. In some embodiments, the administrator may configure the settings to change the default settings on threshold level of the consistency scores.

Then, at 516, the aggregated score is computed. The B2M adaptation program 110a, 110b may compute an aggregated score (e.g., normalized quantity ranging from 0-1, 0-10, 0-100, 0-100%) for each candidate based on average of the real valued scoring on the persuasiveness of the past movies and/or auditions of candidate actor (persuasiveness score), real valued scoring of an overlayed video (GAN score), and the real value scoring of how the candidate actor may adhere to the textual description of a target character in the movie (consistency score). The B2M adaptation program 110a, 110b may calculate the average (or mean) of the persuasiveness, GAN and consistency scores thereby computing the aggregated score for each candidate actor for a particular target character based on different dimensions. In some embodiments, the B2M adaptation program 110a, 110b may compute the aggregated score by calculating the median of the persuasiveness, GAN and consistency scores. The median may then be converted into the aggregated score.

In at least one embodiment, the B2M adaptation program 110a, 110b may analyze each target character separately, and may combine the results of separate analysis prior to presenting the list of potential cast members.

Continuing the previous example, the aggregated score for Candidates A, F and K are as follows: Candidate A: Aggregated Score is 0.58; Candidate F: Aggregated Score is 0.68; and Candidate K: Aggregated Score is 0.51.

Then, at 518, a list of potential cast members is presented. Based on the aggregated scores of each candidate for each target character, a ranked list of potential cast members with corresponding target characters may be generated for each demography associated with the movie by utilizing a recommendation engine. The ranked list of potential cast members may be transmitted to the B2M adaptation program 110a, 110b, via the communication network 116. The B2M adaptation program 110a, 110b may then present the list of potential cast members to the user. The list of potential cast members may be presented in a table, a lineage graph, a bar graph, a written list, or any other form previously determined by the user as a preferred presentation form for the list of potential cast members.

In at least one embodiment, the B2M adaptation program 110a, 110b may present the list of potential cast members divided into multiple lists based on a preferred dimension (e.g., highest ranked potential cast members regardless of target characters included in one list, each list may represent a target character, each list may represent a particular demography).

In at least one embodiment, the B2M adaptation program 110a, 110b may utilize an internal ranker module to rank the candidate actors for each target character in the movie. The internal ranker module may utilize the overlay characteristics of the candidate actor on past videos and the naturalness of the generated overlayed video, and then compute a score for the appropriateness of the candidate actor as the target character. However, the B2M adaptation program 110a, 110b may utilize this internal ranker module for ranking and not to generate an output score.

In at least one embodiment, the B2M adaptation program 110a, 110b may include a reason for the ranking for each cast member in the ranked list of potential cast members. In a table, for example, the B2M adaptation program 110a, 110b includes a column entitled "Reasons for Ranking" in which an explanation is provided on the reasons for the particular ranking of the candidate actor for the particular target character in a specific demography. In a lineage graph or bar graph, for example, the B2M adaptation program 110a, 110b may explain the reason for ranking when the user hovers the mouse over the point or bar indicative of the particular ranking of the potential cast member.

In some embodiments, the B2M adaptation program 110a, 110b may be integrated into another software program that may send or receive electronic communication (e.g., emails, messages) to other previously approved people associated with the production of the movie. Therefore, the user may electronically transmit the list of potential cast members to these previously approved people. For security and privacy reasons, the user may opt-in or opt-out of this feature.

Continuing the previous example, for Target Character Q, the candidates are ranked as follows: (1) Candidate F; (2) Candidate A; and (3) Candidate K.

Figure 6:
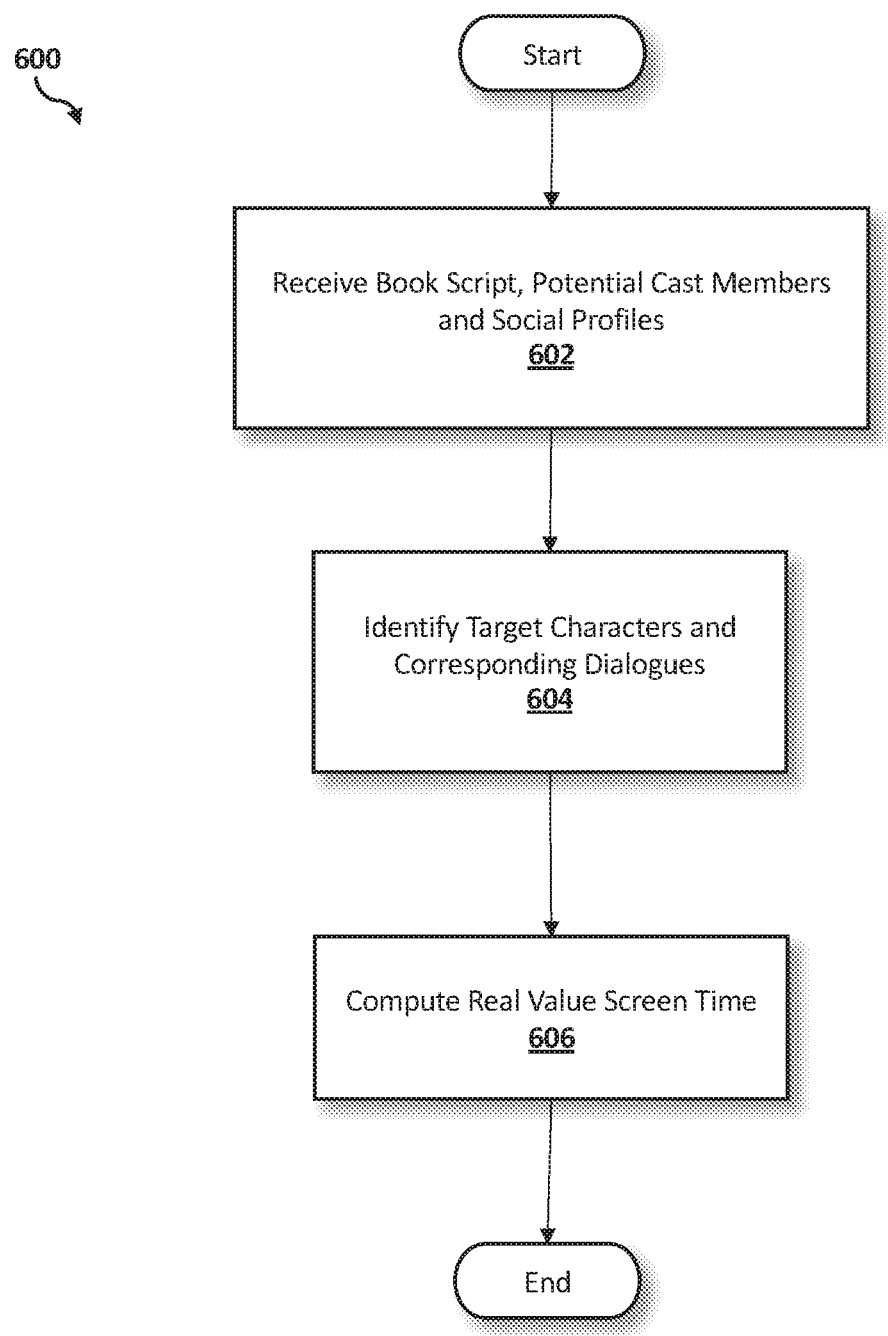
FIG. 6 is an operational flowchart illustrating a process for predicting screen time according to at least one embodiment.

Referring now to FIG. 6, an operational flowchart illustrating the exemplary screen time prediction process 600 used by the B2M adaptation program 110a, 110b according to at least one embodiment is depicted.

At 602, the book script, potential cast members and social profiles are received. Utilizing a software program 108 on the user's device (e.g., user's computer 102), the B2M adaptation program 110a, 110b receives as input, via the communication network 116, data associated with the book script (i.e., book), potential cast members and a social profile associated with each candidate (i.e., actor or/and actress) from the actor and/or movie rating system (e.g., IMDb®, Rotten Tomatoes®). The B2M adaptation program 110a, 110b may utilize a search engine to search the internet for the social profiles associated with each candidate actor, and the search engine may then transmit, via the communication network 116, the social profiles to the B2M adaptation program 110a, 110b, or to a repository 506 (e.g., database 114) associated with the B2M adaptation program 110a, 110b for future access and use.

In the present embodiment, the B2M adaptation program 110a, 110b may receive the book script for the screen time prediction process 600 and may determine the individual screen time for each individual dialogue in the received book script.

In at least one embodiment, the user may previously determine that the screen time prediction process 600 may determine the screen time for each scene of the movie separately by an administrator configuring the settings. As such, the B2M adaptation program 110a, 110b may receive as input the applicable scenes from the book script, and not the entire book script.

Continuing the previous example, the B2M adaptation program 110a, 110b receives, as input, Book XYZ, the determination that Candidate F will be Target Character Q, and Social Profile F (which is associated with Candidate F).

Next, at 604, the target characters and corresponding dialogues are identified. For each scene of the book, the B2M adaptation program 110a, 110b may identify the target characters and the corresponding dialogues associated with each target character for each scene by utilizing a hierarchical recurrent neural network (hierarchical RNN) (e.g., long short-term memory network that may utilize blocks, instead of neurons, and memory to calculate time-series predictions and model sequential). A machine learning (ML) model may perform text component filtering through the received book script, and may then identify and segment different scenes within the received book script for the purpose of predicting the screen time associated with each scene and individual dialogues included in the scene. The identified and segmented scenes and the corresponding individual dialogues in each scene may be fed to the first hidden layer of the hierarchical RNN.

Additionally, in the first hidden layer of the hierarchical RNN, the B2M adaptation program 110a, 110b may utilize the ML model to identify which target characters are present for each identified scene in the book script, and the appropriate individual dialogue(s) for each target character. By using natural language processing techniques (e.g., name entity recognition, simple text analysis, tokenization, location entity recognition), the hierarchical RNN may utilize the text description of each scene to identify whether the target character was mentioned in the scene, and then whether the target character was present (e.g., remotely present or physically present) in the scene (e.g., whether the target character has a dialogue or a part of a conversation, or there is a mention that the target character was involved in the scene).

Continuing the previous example, the B2M adaptation program 110a, 110b utilizes hierarchical RNN to identify that Target Character Q is in Scene 7 of Book XYZ and, additionally, Target Characters M and T are in Scene 7. However, Target Character Q is the only target character who speaks in that dialogue.

Then, at 606, the real value screen time is computed. The identified target characters and corresponding individual dialogues associated with each scene, from the first hidden layer of the hierarchical RNN, may be fed to the second hidden layer for analysis. In the second hidden layer, the identified target characters and the corresponding dialogues in each scene may be fed into a regression model (e.g., a statistical method in which the relationship between the target characters and the corresponding dialogues for each scene are analyzed) where the relationship of the target characters and the corresponding dialogues for each scene may be analyzed to determine whether any factors may be present that affect the time for each individual dialogue of the identified target characters. In addition, the regression model may place regression heads to mark the beginning and end of each individual dialogue in each scene. The output prediction, using the regression head of the second hidden layer of the hierarchical RNN, may be the real value screen time.

In at least one embodiment, the B2M adaptation program 110a, 110b may employ a post-processing step of normalizing the predicted screen times for each individual dialogue to ensure that the cumulative time is within a previously determined threshold. For example, if the user previously determined that the movie should be a short film with a running time of 40 minutes or less, including credits, the B2M adaptation program 110a, 110b may then allocate no more than one minute for any individual dialogue. Therefore, the B2M adaptation program 110a, 110b may determine the longest dialogue in the short film as one minute long, and proportionately allocate times for the shorter individual dialogue (e.g., if the longest individual dialogue at 20 pages is allocated one minute, then another individual dialogue at 10 pages, half the length of the longest, would be allocated 30 seconds).

In at least one embodiment, the RNN framework may add more normalization layers across individual dialogues based on the total screen time for the particular scene.

Continuing the previous example, as an output of the hierarchical RNN, the B2M adaptation program 110a, 110b determines that the individual dialogue in Scene 7 with Target Character Q will last 25 seconds.

In the present embodiment, the RNN framework utilized by the B2M adaptation program 110a, 110b may be continuous over the book script in which the hidden state output of the previous scene and corresponding end dialogue may be utilized to initialize the hidden state for the next scene and corresponding first dialogue.

The functionality of a computer may be improved by the B2M adaptation program 110a, 110b because the B2M adaptation program 110a, 110b may analyze the book script, among other data, with the goal of creating a movie adapted from the book, and the B2M adaptation program 110a, 110b may automatically create scene composition and screen time of characters in the movie from the book itself. The B2M adaptation program 110a, 110b may also automatically create movie adaptations from books by identifying and recommending text snippets for inclusion in a movie based on models learned from past B2M adaptations and corresponding movie reviews. The B2M adaptation program 110a, 110b may include the automated creation of scene composition and screen time of characters in the movie from the book itself.

The B2M adaptation program 110a, 110b may then recommend cast members corresponding to book characters as per demography, trending and other factors associated with the popularity of a cast member within a specific group of people, and may recommend adaptations with varying locations and events based on audience demography. The B2M adaptation program 110a, 110b may train a dialog level hierarchical RNN, which takes a dialog of the movie and outputs the corresponding screen time for that part of the movie. The B2M adaptation program 110a, 110b may further predict screen time per character and scene, and may employ a post-processing step of normalizing the predicted times to ensure the cumulative time is within a threshold.

It may be appreciated that FIGS. 2-6 provide only an illustration of one embodiment and do not imply any limitations with regard to how different embodiments may be implemented. Many modifications to the depicted embodiment(s) may be made based on design and implementation requirements.

Figure 7:
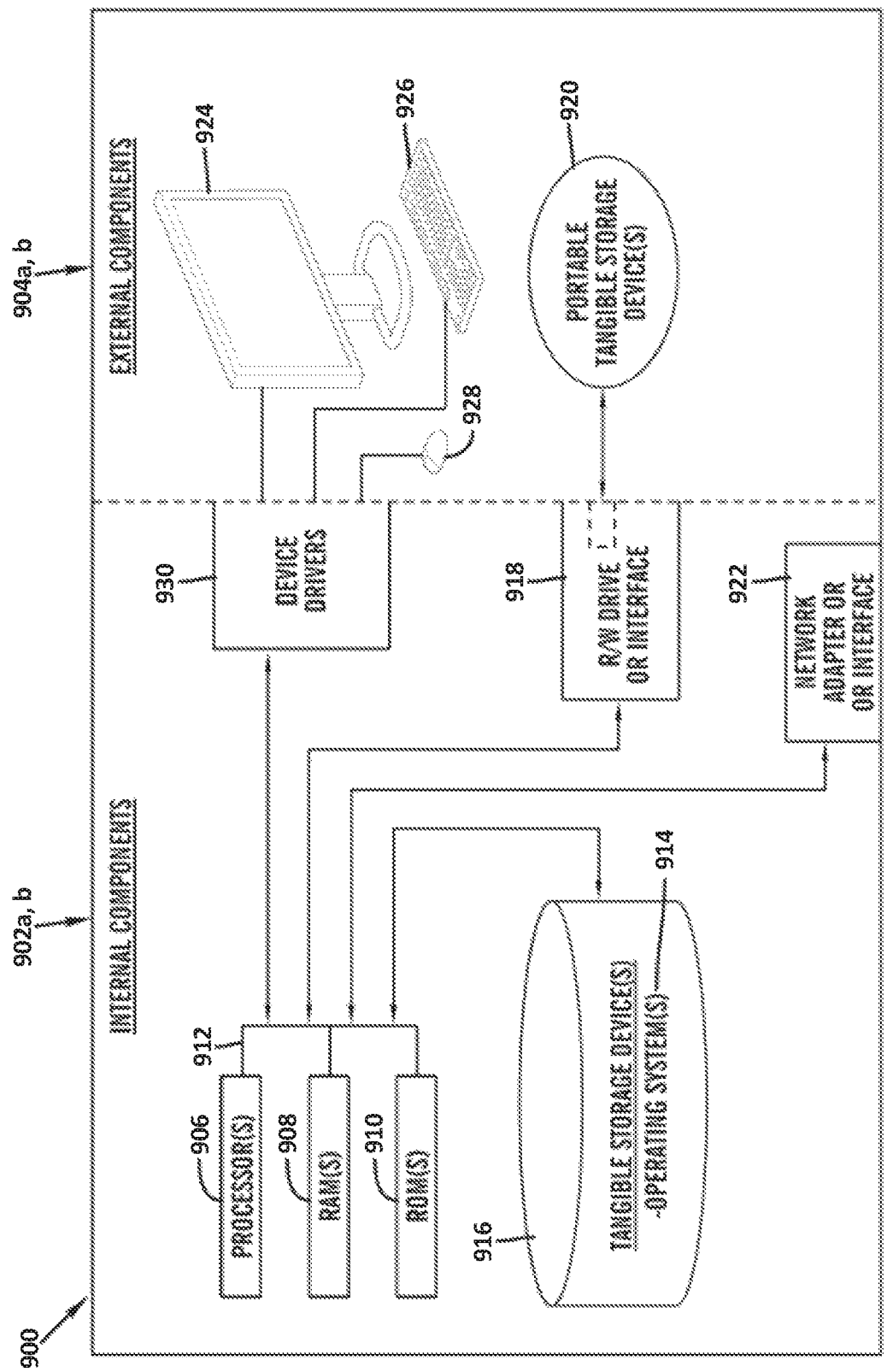
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the B2M adaptation program 110a in client computer 102, and the B2M adaptation program 110b in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the personalized B2M adaptation program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the personalized B2M adaptation program 110a in client computer 102 and the personalized B2M adaptation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the personalized B2M adaptation program 110a in client computer 102 and the personalized B2M adaptation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
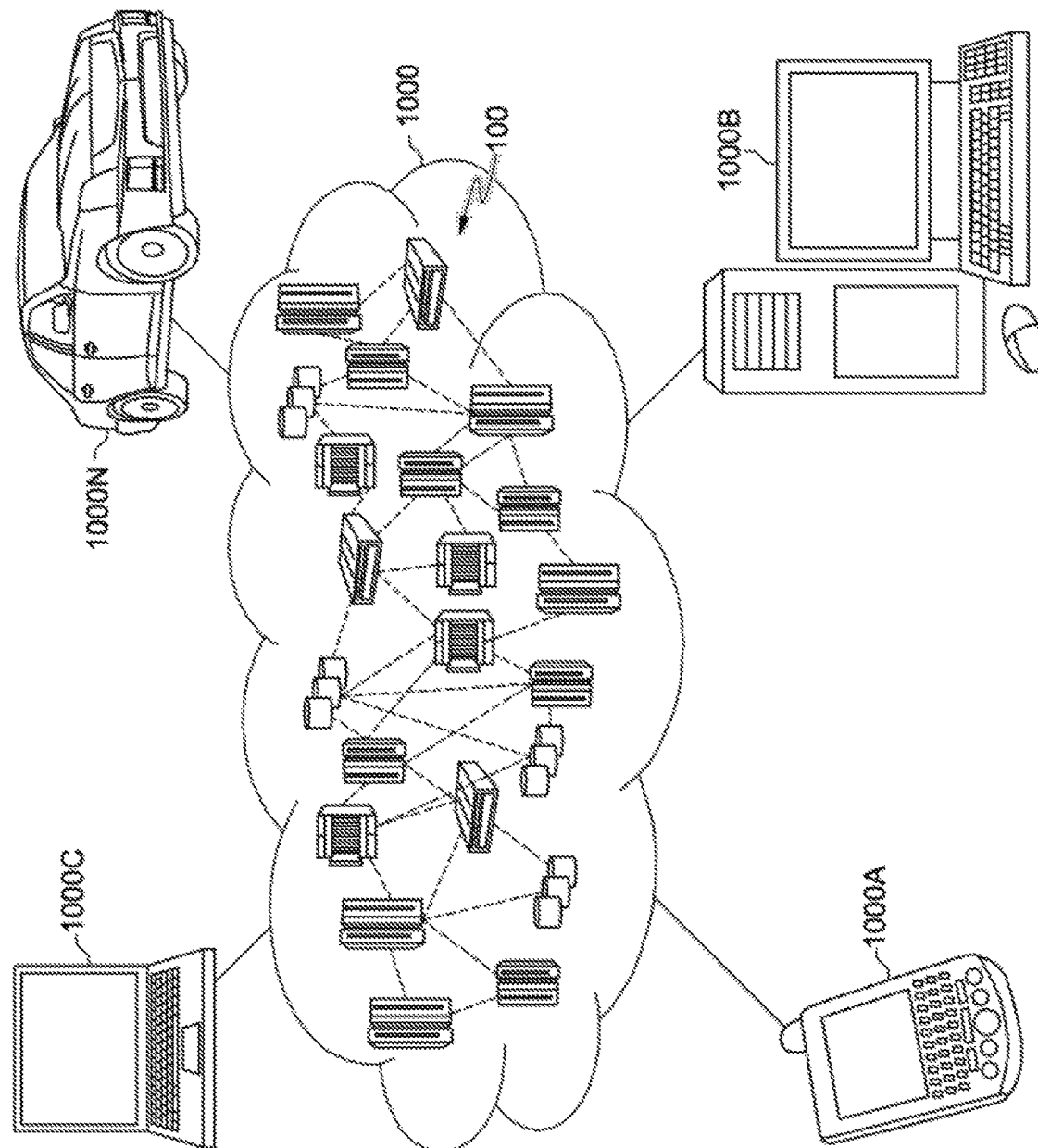
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and personalized B2M adaptation recommendation 1156. A personalized B2M adaptation program 110a, 110b provides a way to automatically create a movie adaptation from a book.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a user, a piece of input data, wherein the input data includes a book script, and a plurality of past book-to-movie adaptations;
   identifying a plurality of text snippets associated with the received book script; and
   recommending the plurality of text snippets associated with the received book script to include in a movie based on the plurality of past book-to-movie adaptations and a plurality of movie reviews corresponding with the plurality of past book-to-movie adaptations, wherein recommending the plurality of text snippets associated with the received book script to include in the movie based on the plurality of past book-to-movie adaptations and the plurality of movie reviews corresponding with the plurality of past book-to-movie adaptations, further comprises:
      mapping the plurality of text snippets to the movie, wherein the mapping divides the received book script into a plurality of scenes, wherein one or more top-k best matches associated with the plurality of text snippets of each event are retrieved based on a plurality of events in each scene from the plurality of scenes in the divided book script, wherein a plurality of candidate mappings are generated.

2. The method of claim 1, wherein recommending the plurality of text snippets associated with the received book script to include in the movie based on the plurality of past book-to-movie adaptations and the plurality of movie reviews corresponding with the plurality of past book-to-movie adaptations, further comprises:
   determining a sentiment associated with the mapped plurality of text snippets based on the plurality of past book-to-movie adaptations and the plurality of movie reviews corresponding with the plurality of past book-to-movie adaptations.

3. The method of claim 2, wherein mapping the plurality of text snippets to the movie, further comprises:
   determining a plurality of optimum bijection mappings based on the generated plurality of candidate mappings; and
   classifying the determined plurality of optimum bijection mappings.

4. The method of claim 3, wherein retrieving one or more top-k best matches associated with the plurality of text snippets of each event based on the plurality of events in each scene from the plurality of scenes in the divided book script, further comprises:
   determining one or more correlational autoencoder based on a multimodal common representation between a plurality of video image sequences and the plurality of text snippets by utilizing a book-to-movie mapped data, wherein the plurality of video image sequences is derived from a video snippet associated with the movie;
   creating an approximate nearest neighbor index associated with the multimodal common representation associated with the plurality of text snippets;
   encoding the plurality of video image sequences into a form associated with the multimodal common representation;
   retrieving a plurality of nearest neighbors in a common representation space to the encoded plurality of video image sequences; and
   mapping the retrieved plurality of nearest neighbors to the plurality of text snippets associated with the received book script.

5. The method of claim 3, wherein determining the plurality of optimum bijection mappings based on the generated plurality of candidate mappings, further comprises:
   training a mapping function to generate a score associated with each candidate mapping from the generated plurality of candidate mappings, wherein a temporal consistency with a scene in the movie is considered;
   matching a first element with a second element to generate the plurality of optimum bijection mappings, wherein the first element is a text snippet associated with the generated plurality of candidate mappings, wherein the second element is a video snippet; and
   eliminating one or more first elements and one or more second elements that are unmatched.

6. The method of claim 3, wherein dividing the received book script into the plurality of scenes, further comprises:
   parsing the received book script by utilizing a segmentation module; and
   segmenting the parsed book script into the plurality of scenes based on one or more defined breaks, wherein the one or more defined breaks include chapters, subtitles, and sub-headings.

7. The method of claim 3, wherein classifying the determined plurality of optimum bijection mappings, further comprises:
   analyzing the text snippet associated with each determined plurality of optimum bijection mappings with a plurality of historical data by utilizing a classifier, wherein the plurality of historical data indicates whether the text snippet includes one or more important events associated with the book script; and
   in response to determining that the text snippet includes the one or more important events associated with the book script, classifying the optimum bijection mapping associated with the text snippet as a good mapping, wherein the good mapping is included in the movie.

8. The method of claim 7, further comprising:
   in response to determining that the text snippet excludes the one or more important events associated with the book script, classifying the optimum bijection mapping associated with the text snippet as a bad mapping, wherein the bad mapping is excluded from the movie.

9. A computer system for automatically recommending a plurality of text snippets from a book script for a movie adaptation, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving, by a user, a piece of input data, wherein the input data includes the book script, and a plurality of past book-to-movie adaptations;

identifying a plurality of text snippets associated with the received book script; and recommending the plurality of text snippets associated with the received book script to include in a movie based on the plurality of past book-to-movie adaptations and a plurality of movie reviews corresponding with the plurality of past book-to-movie adaptations, wherein recommending the plurality of text snippets associated with the received book script to include in the movie based on the plurality of past book-to-movie adaptations and the plurality of movie reviews corresponding with the plurality of past book-to-movie adaptations, further comprises:

mapping the plurality of text snippets to the movie, wherein the mapping divides the received book script into a plurality of scenes, wherein one or more top-k best matches associated with the plurality of text snippets of each event are retrieved based on a plurality of events in each scene from the plurality of scenes in the divided book script, wherein a plurality of candidate mappings are generated.

10. The computer system of claim 9, wherein recommending the plurality of text snippets associated with the received book script to include in the movie based on the plurality of past book-to-movie adaptations and the plurality of movie reviews corresponding with the plurality of past book-to-movie adaptations, further comprises:

determining a sentiment associated with the mapped plurality of text snippets based on the plurality of past book-to-movie adaptations and the plurality of movie reviews corresponding with the plurality of past book-to-movie adaptations.

11. The computer system of claim 10, wherein mapping the plurality of text snippets to the movie, further comprises:

determining a plurality of optimum bijection mappings based on the generated plurality of candidate mappings; and classifying the determined plurality of optimum bijection mappings.

12. The computer system of claim 11, wherein retrieving one or more top-k best matches associated with the plurality of text snippets of each event based on the plurality of events in each scene from the plurality of scenes in the divided book script, further comprises:

determining one or more correlational autoencoder based on a multimodal common representation between a plurality of video image sequences and the plurality of text snippets by utilizing a book-to-movie mapped data, wherein the plurality of video image sequences is derived from a video snippet associated with the movie;

creating an approximate nearest neighbor index associated with the multimodal common representation associated with the plurality of text snippets;

encoding the plurality of video image sequences into a form associated with the multimodal common representation;

retrieving a plurality of nearest neighbors in a common representation space to the encoded plurality of video image sequences; and mapping the retrieved plurality of nearest neighbors to the plurality of text snippets associated with the received book script.

13. The computer system of claim 11, wherein determining the plurality of optimum bijection mappings based on the generated plurality of candidate mappings, further comprises:

training a mapping function to generate a score associated with each candidate mapping from the generated plurality of candidate mappings, wherein a temporal consistency with a scene in the movie is considered;

matching a first element with a second element to generate the plurality of optimum bijection mappings, wherein the first element is a text snippet associated with the generated plurality of candidate mappings, wherein the second element is a video snippet; and eliminating one or more first elements and one or more second elements that are unmatched.

14. The computer system of claim 11, wherein dividing the received book script into the plurality of scenes, further comprises:

parsing the received book script by utilizing a segmentation module; and segmenting the parsed book script into the plurality of scenes based on one or more defined breaks, wherein the one or more defined breaks include chapters, subtitles, and sub-headings.

15. The computer system of claim 11, wherein classifying the determined plurality of optimum bijection mappings, further comprises:

analyzing the text snippet associated with each determined plurality of optimum bijection mappings with a plurality of historical data by utilizing a classifier, wherein the plurality of historical data indicates whether the text snippet includes one or more important events associated with the book script; and in response to determining that the text snippet includes the one or more important events associated with the book script, classifying the optimum bijection mapping associated with the text snippet as a good mapping, wherein the good mapping is included in the movie.

16. The computer system of claim 15, further comprising:

in response to determining that the text snippet excludes the one or more important events associated with the book script, classifying the optimum bijection mapping associated with the text snippet as a bad mapping, wherein the bad mapping is excluded from the movie.

17. A computer program product for automatically recommending a plurality of text snippets from a book script for a movie adaptation, the computer program product comprising a computer readable storage medium having program instructions embodied therewith, the program instructions executable by processor to:

receiving, by a user, a piece of input data, wherein the input data includes the book script, and a plurality of past book-to-movie adaptations;

identifying a plurality of text snippets associated with the received book script; and recommending the plurality of text snippets associated with the received book script to include in a movie based on the plurality of past book-to-movie adaptations and a plurality of movie reviews corresponding with the plurality of past book-to-movie adaptations, wherein recommending the plurality of text snippets associated with the received book script to include in the movie based on the plurality of past book-to-movie adaptations and the plurality of movie reviews corresponding with the plurality of past book-to-movie adaptations, further comprises:
  mapping the plurality of text snippets to the movie, wherein the mapping divides the received book script into a plurality of scenes, wherein one or more top-k best matches associated with the plurality of text snippets of each event are retrieved based on a plurality of events in each scene from the plurality of scenes in the divided book script, wherein a plurality of candidate mappings are generated.

18. The computer program product of claim 17, wherein recommending the plurality of text snippets associated with the received book script to include in the movie based on the plurality of past book-to-movie adaptations and the plurality of movie reviews corresponding with the plurality of past book-to-movie adaptations, further comprises:
  determining a sentiment associated with the mapped plurality of text snippets based on the plurality of past book-to-movie adaptations and the plurality of movie reviews corresponding with the plurality of past book-to-movie adaptations.

19. The computer program product of claim 18, wherein mapping the plurality of text snippets to the movie, further comprises:
  determining a plurality of optimum bijection mappings based on the generated plurality of candidate mappings; and
  classifying the determined plurality of optimum bijection mappings.

20. The computer program product of claim 19, wherein classifying the determined plurality of optimum bijection mappings, further comprises:
  analyzing the text snippet associated with each determined plurality of optimum bijection mappings with a plurality of historical data by utilizing a classifier, wherein the plurality of historical data indicates whether the text snippet includes one or more important events associated with the book script; and
  in response to determining that the text snippet includes the one or more important events associated with the book script, classifying the optimum bijection mapping associated with the text snippet as a good mapping, wherein the good mapping is included in the movie.

* * * * *